(12) United States Patent
Chen et al.

(10) Patent No.: US 12,449,400 B2
(45) Date of Patent: Oct. 21, 2025

(54) DETECTION METHOD BASED ON BATTERY DEFECT DETECTION SYSTEM, SYSTEM AND STORAGE MEDIUM

(71) Applicant: Guangdong Lyric Robot Automation Co., Ltd., Huizhou (CN)

(72) Inventors: De Chen, Huizhou (CN); Qihui Lu, Huizhou (CN); Peng Fan, Huizhou (CN)

(73) Assignee: Guangdong Lyric Robot Automation Co., Ltd., Huizhou (CN)

( * ) Notice: Subject to any disclaimer, the term of this patent is extended or adjusted under 35 U.S.C. 154(b) by 0 days.

(21) Appl. No.: 18/013,275

(22) PCT Filed: Nov. 14, 2022

(86) PCT No.: PCT/CN2022/131591
§ 371 (c)(1),
(2) Date: Dec. 28, 2022

(87) PCT Pub. No.: WO2023/124585
PCT Pub. Date: Jul. 6, 2023

(65) Prior Publication Data
US 2024/0102966 A1    Mar. 28, 2024

(30) Foreign Application Priority Data
Dec. 31, 2021  (CN) .......................... 202111674748.6

(51) Int. Cl.
*G01N 29/06*    (2006.01)
(52) U.S. Cl.
CPC ....... *G01N 29/069* (2013.01); *G01N 29/0618* (2013.01)

(58) Field of Classification Search
None
See application file for complete search history.

(56) References Cited

U.S. PATENT DOCUMENTS 9,594,059 B1 * 3/2017 Brady ................. G01N 29/225
2006/0254359 A1 * 11/2006 Langlois ............ G01N 29/0609
73/606

(Continued)

FOREIGN PATENT DOCUMENTS

| CN | 102928506 A | 2/2013 |
| CN | 104865317 A | 8/2015 |

(Continued)

OTHER PUBLICATIONS

Machine translation of Jin (Year: 2019).*

(Continued)

*Primary Examiner* — Matthew G Marini
(74) *Attorney, Agent, or Firm* — Daylight Law, P.C.

(57) ABSTRACT

A detection method based on a battery defect detection system, a system and a storage medium are disclosed. The detection method includes: acquiring a scanning trigger signal, and controlling an ultrasonic transceiver and a motion control platform to work, so that the ultrasonic transceiver receives waveform data of ultrasonic waves passing through a cell; controlling an oscilloscope to collect the waveform data; receiving the waveform data and performing imaging processing to obtain an imaging diagram; and detecting whether or not the cell has a defect according to the imaging diagram.

9 Claims, 6 Drawing Sheets

(56) References Cited

U.S. PATENT DOCUMENTS

2019/0323993 A1    10/2019  Rodrigues et al.
2021/0018473 A1     1/2021  Takemoto

FOREIGN PATENT DOCUMENTS

| CN | 105067705 | A |   | 11/2015 | |
|---|---|---|---|---|---|
| CN | 109387564 | A | * | 2/2019 | ........... G01B 17/025 |
| CN | 109856238 | A | * | 6/2019 | |
| CN | 113533523 | A |   | 10/2021 | |
| CN | 113758932 | A |   | 12/2021 | |
| WO | 2018098516 | A1 |   | 6/2018 | |

OTHER PUBLICATIONS

Machine translation of Li H (Year: 2019).*
International Search Report from International Application No. PCT/CN2022/131591 dated Feb. 14, 2023, 4 pages.
Written Opinion of the International Search Authority from International Application No. PCT/CN2022/131591 dated Feb. 14, 2023, 3 pages.
Supplementary Extended European Search Report dated May 7, 2024 from European Application No. 22822836.7, 58 pages.

* cited by examiner

DETECTION METHOD BASED ON BATTERY DEFECT DETECTION SYSTEM, SYSTEM AND STORAGE MEDIUM

CROSS-REFERENCE TO RELATED APPLICATION

This application is a national stage filing under 35 U.S.C. § 371 of international application number PCT/CN2022/131591, filed Nov. 14, 2022, which claims priority to Chinese patent application No. 202111674748.6 filed Dec. 31, 2021. The contents of these applications are incorporated herein by reference in their entirety for all purposes.

BACKGROUND

Lithium batteries have high power tolerance and have been widely used in various power systems. The quality of a cell directly determines the quality of the battery. Typically, it is necessary to carry out defect detection on the cell after the completion of the cell. Detection contents include tab soldering quality detection (to detect whether there is Pseudo soldering or over-soldering), whether there are bubbles inside the cell, and edge sealing quality of a soft-packaged cell.

However, at present, X-ray method or machine vision method is mainly used for cell defect detection. The X-ray method mainly uses X-ray generated by a radiation source to analyze defects, while the machine vision method mainly detects cell surface defects based on an image processing technology. However, the device used in the X-ray cell detection method occupies a large area, has special requirements for radiation source, requires special radiation protection, requires high technical requirements for operators, and requires a large investment in device maintenance. The X-ray method is more suitable for sampling and detecting samples in laboratory, and is not conducive to large-scale application in a power battery production line. Although the machine vision detection method has certain effects, detection results thereof are only limited to the surface defects, so the machine vision detection method has narrow application scope and lacks accurate identification ability for internal defects.

SUMMARY

This disclosure relates to the technical field of detection, in particular to a detection method based on a battery defect detection system, a system and a storage medium.

The disclosure aims at solving at least one of the technical problems in the existing technology. Therefore, the disclosure provides a detection method based on a battery defect detection system, a system and a storage medium, which can accurately identify cell defects.

In a first aspect, embodiments of the disclosure provide a detection method based on a battery defect detection system, wherein the battery defect detection system includes a battery, an ultrasonic transceiver for transmitting ultrasonic waves to the battery, an oscilloscope and a motion control platform for scanning the battery, the ultrasonic transceiver is electrically connected with the oscilloscope and the motion control platform respectively, and the detection method includes:

acquiring a scanning trigger signal, and controlling the ultrasonic transceiver and the motion control platform to work, so that the ultrasonic transceiver receives waveform data of ultrasonic waves passing through a cell;

controlling the oscilloscope to collect the waveform data;

receiving the waveform data and performing imaging processing on the waveform data to obtain an imaging diagram; and detecting whether or not the cell has a defect according to the imaging diagram.

The detection method based on the battery defect detection system according to the embodiments of the disclosure at least has the following beneficial effects. When the scanning trigger signal is acquired, the ultrasonic transceiver is controlled to emit ultrasonic waves to the battery, and the motion control platform scans the battery within the preset scanning range, so that the ultrasonic transceiver receives the waveform data, and the waveform data is collected by the oscilloscope, which is convenient for analyzing the waveform data. As the waveform data is the data of ultrasonic waves after the ultrasonic waves pass through the cell, the internal defects of the cell can be accurately identified. By analyzing the waveform data and performing imaging processing, whether or not the cell has a defect can be intuitively judged according to the imaging diagram, and an operator can generate the imaging diagram by simply triggering the scanning trigger signal, so the operation is simple and convenient.

In the detection method above, the motion control platform includes a servo driver, a servo motor and a scanning frame which are connected in sequence, the servo motor is connected with the servo driver and the scanning frame respectively, and the servo motor is configured for driving the scanning frame to perform step motion within a preset scanning range, so that the ultrasonic transceiver receives multiple segments of waveform data, and the oscilloscope collects the waveform data in segments. After the ultrasonic transceiver starts to work, the ultrasonic transceiver transmits synchronization signal to the oscilloscope and the motion control platform respectively, so that the motion control platform starts to perform each step scanning motion and the oscilloscope starts to read each waveform data.

In the detection method above, the performing imaging processing on the waveform data to obtain an imaging diagram includes:

performing wavelet threshold de-noising processing on the multiple segments of waveform data to obtain a plurality of corresponding first feature values;

averaging the plurality of first feature values to obtain a second feature value; and performing imaging processing based on the second feature value to obtain the imaging diagram.

In the detection method above, the imaging diagram is a heat map, and the detecting whether or not the cell has a defect according to the imaging diagram includes:

acquiring a real image of the battery, and determining a first comparison diagram of a corresponding cell region in the real image;

determining a corresponding second comparison diagram in the imaging diagram according to the first comparison diagram;

determining whether a preset color region exists in the second comparison diagram according to a preset color of the heat map, wherein the preset color region is a defective region; and determining that the cell has a defect when the preset color region exists in the second comparison diagram.

In the detection method above, after the determining that the cell has a defect, the method further includes:

partitioning the first comparison diagram and the second comparison diagram; and comparing each region in the second comparison diagram with a corresponding region in the first comparison diagram to obtain position information of the defective region.

In a second aspect, embodiments of the disclosure provide a battery defect detection system, including a controller, a battery, an ultrasonic transceiver for transmitting ultrasonic waves to the battery, an oscilloscope and a motion control platform for scanning the battery, the ultrasonic transceiver is electrically connected with the oscilloscope and the motion control platform respectively, the controller is connected with the ultrasonic transceiver, the oscilloscope and the motion control platform respectively, and the controller is configured for executing the detection method according to the embodiments of the first aspect.

The battery defect detection system according to the embodiments of the disclosure at least has the following beneficial effects. When the scanning trigger signal is acquired, the controller controls the ultrasonic transceiver to emit ultrasonic waves to the battery, and the motion control platform scans the battery within the preset scanning range, so that the ultrasonic transceiver receives the waveform data, and the waveform data is collected by the oscilloscope, which is convenient for analyzing the waveform data. As the waveform data is the data of ultrasonic waves after the ultrasonic waves pass through the cell, the internal defects of the cell can be accurately identified. By analyzing the waveform data and performing imaging processing, whether or not the cell has a defect can be intuitively judged according to the imaging diagram, and an operator can generate the imaging diagram by simply triggering the scanning trigger signal, so the operation is simple and convenient.

The battery defect detection system above further includes a signal conditioning board, wherein the ultrasonic transceiver is connected with the oscilloscope and the motion control platform respectively through the signal conditioning board, and the motion control platform includes a servo driver, a servo motor and a scanning frame which are connected in sequence, the servo motor is connected with the servo driver and the scanning frame respectively, and the servo motor is configured for driving the scanning frame to perform step motion within a preset scanning range, so that the ultrasonic transceiver receives multiple segments of waveform data, and the oscilloscope collects the waveform data in segments. After the ultrasonic transceiver starts to work, the ultrasonic transceiver transmits synchronization signal to the oscilloscope and the motion control platform respectively, so that the motion control platform starts to perform each step scanning motion and the oscilloscope starts to read each waveform data.

The battery defect detection system above further includes a preamplifier, and a transmitting probe and a receiving probe arranged on the scanning frame, wherein the transmitting probe is connected with the ultrasonic transceiver, and the preamplifier is connected with the receiving probe and the ultrasonic transceiver respectively.

In a third aspect, embodiments of the disclosure provide an operation control device, including at least one control processor and a non-transitory computer-readable memory communicatively connected with the at least one control processor, wherein the memory stores instructions executable by the at least one processor, and the instructions, when executed by the at least one processor, causes the at least one processor to perform the detection method according to the embodiments of the first aspect.

The operation control device according to the embodiments of the disclosure at least has the following beneficial effects. When the scanning trigger signal is acquired, the ultrasonic transceiver is controlled to emit ultrasonic waves to the battery, and the motion control platform scans the battery within the preset scanning range, so that the ultrasonic transceiver receives the waveform data, and the waveform data is collected by the oscilloscope, which is convenient for analyzing the waveform data. As the waveform data is the data of ultrasonic waves after the ultrasonic waves pass through the cell, the internal defects of the cell can be accurately identified. By analyzing the waveform data and performing imaging processing, whether or not the cell has a defect can be intuitively judged according to the imaging diagram, and an operator can generate the imaging diagram only by triggering the scanning trigger signal, so the operation is simple and convenient.

In a fourth aspect, embodiments of the disclosure provide a non-transitory computer-readable storage medium, wherein the computer-readable storage medium stores computer-executable instructions which, when executed by a computer, causes the computer to perform the detection method according to the embodiments of the first aspect.

The computer-readable storage medium according to the embodiments of the disclosure at least has the following beneficial effects. When the scanning trigger signal is acquired, the ultrasonic transceiver is controlled to emit ultrasonic waves to the battery, and the motion control platform scans the battery within the preset scanning range, so that the ultrasonic transceiver receives the waveform data, and the waveform data is collected by the oscilloscope, which is convenient for analyzing the waveform data. As the waveform data is the data of ultrasonic waves after the ultrasonic waves pass through the cell, the internal defects of the cell can be accurately identified. By analyzing the waveform data and performing imaging processing, whether or not the cell has a defect can be intuitively judged according to the imaging diagram, and an operator can generate the imaging diagram by simply triggering the scanning trigger signal, so the operation is simple and convenient.

Other features and advantages of the disclosure will be elaborated in the following description, and will be partially apparent from the description, or may be learned by practice of the disclosure. The objects and other advantages of the disclosure may be realized and attained by the structure particularly pointed out in the description, claims, and the appended drawings.

BRIEF DESCRIPTION OF THE DRAWINGS

The accompanying drawings serve to provide a further understanding of the technical solutions of the disclosure and constitute a part of the specification, and are used together with the embodiments of the disclosure to explain the technical solutions of the disclosure, and do not constitute limitations to the technical solutions of the disclosure.

The disclosure is further described hereinafter with reference to the drawings and the embodiments.

DETAILED DESCRIPTION

The embodiments of the disclosure will be described in detail, the preferred embodiments of the disclosure are shown in the drawings, the drawings are intended to supplement the description in the written portion of the specification with figures, so that people can intuitively and vividly understand each technical feature and the overall technical solution of the disclosure, but it shall not be understood as a limitation to the protection scope of the disclosure.

In the description of the disclosure, the terms such as first and second if described are for the purpose of distinguishing between the technical features only, and cannot be understood as indicating or implying relative importance, or implicitly indicating the number of technical features indicated thereby, or implicitly indicating the order of technical features indicated thereby.

In the description of the disclosure, unless otherwise explicitly defined, words such as setting, installing and connecting should be understood in a broad sense, and those of ordinary skills in the art can reasonably determine the specific meanings of the above words in the disclosure in combination with the specific contents of the technical solutions.

At present, X-ray method or machine vision method is mainly used for cell defect detection. The X-ray method mainly uses X-ray generated by a radiation source to analyze defects in a cell, while the machine vision method mainly detects cell surface defects based on an image processing technology. However, the device used in the X-ray cell detection method occupies a large area, has special requirements for radiation source, requires special radiation protection, requires high technical requirements for operators, and requires a large investment in device maintenance. The X-ray method is more suitable for sampling and detecting samples in laboratory, and is not conducive to large-scale application in a power battery production line. Although the machine vision detection method has certain effects, but detection results thereof are only limited to the surface defects, so the machine vision detection method has narrow application scope, and lacks accurate recognition capability for internal defects of the cell.

The embodiments of the disclosure provide a detection method based on a battery defect detection system, a system, and a storage medium, which can accurately identify cell defects.

The embodiments of the disclosure are further described below with reference to the accompanying drawings.

Figure 1:
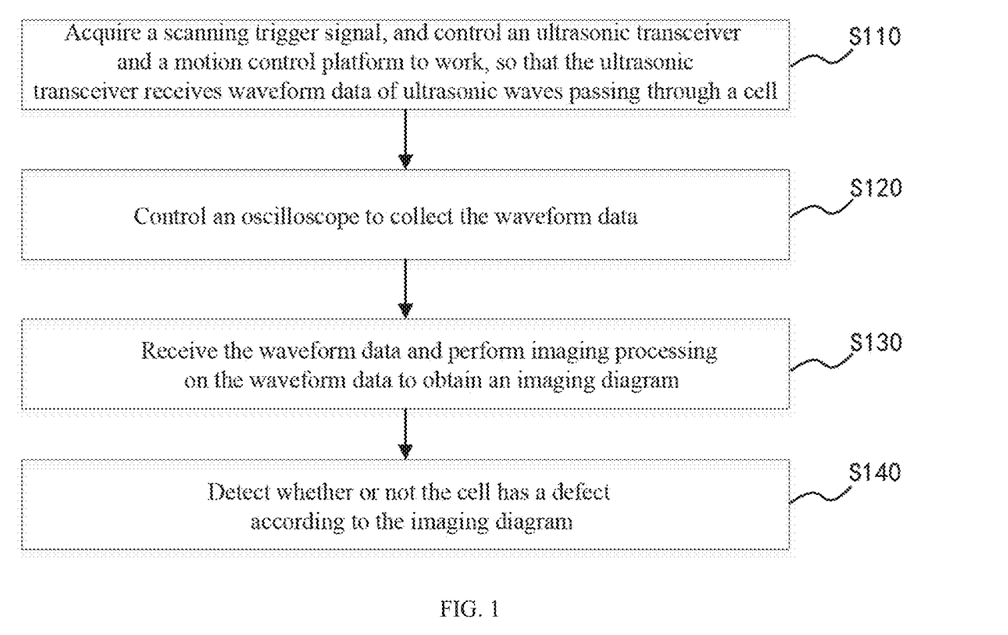
FIG. 1 is a flow chart of a detection method based on a battery defect detection system provided by an embodiment of the disclosure.
Figure 2:
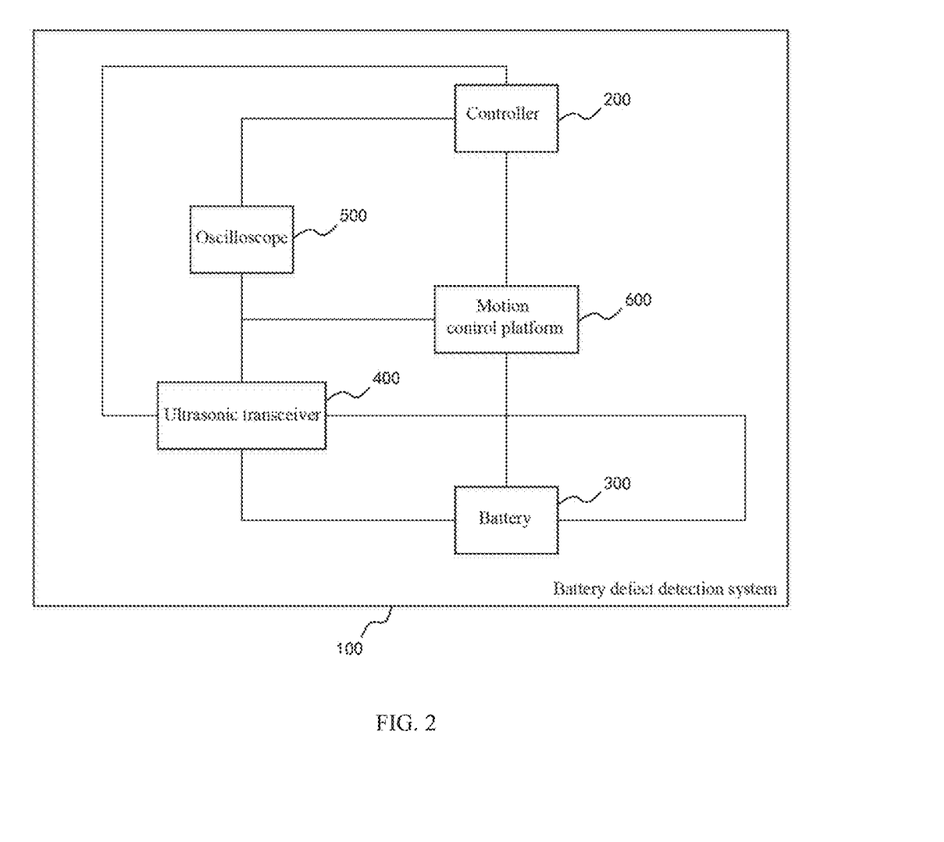
FIG. 2 is a schematic structural diagram of a battery defect detection system provided by an embodiment of the disclosure.

As shown in FIG. 1 and FIG. 2, the embodiments according to a first aspect of the disclosure provide a detection method based on a battery defect detection system 100, wherein the battery defect detection system 100 includes a battery 300, an ultrasonic transceiver for transmitting ultrasonic waves to the battery 300, an oscilloscope 500 and a motion control platform 600 for scanning the battery 300, the ultrasonic transceiver 400 is electrically connected with the oscilloscope 500 and the motion control platform 600 respectively, and the detection method includes, but is not limited to step S110 to step S140.

At step S110, a scanning trigger signal is acquired, and the ultrasonic transceiver and the motion control platform are controlled to work, so that the ultrasonic transceiver receives waveform data of ultrasonic waves passing through a cell.

The scanning trigger signal may be triggered by a user. For example, when the battery 300 needs to be detected, the scanning trigger signal is output by clicking a trigger button and the ultrasonic transceiver 400 and the motion control platform 600 are controlled to start to work according to the scanning trigger signal. It may be understood that when the scanning trigger signal is acquired, the ultrasonic transceiver 400 emits ultrasonic waves with a fixed frequency of 400 kHz to the battery 300. The motion control platform 600 scans the battery 300 within a preset scanning range, so that the ultrasonic transceiver 400 receives the waveform data, and the quality of the cell can be analyzed by analyzing the waveform data.

It should be noted that, in order to facilitate an operator to quickly get familiar with various parameter settings in the detection process and operate the motion control platform 600, a reasonable master computer interface may be designed.

At step S120, the oscilloscope is controlled to collect the waveform data.

It should be noted that, by setting the oscilloscope 500, the waveform data from the ultrasonic transceiver 400 can be collected and displayed in real time, which is convenient for subsequent processing and analysis, and is convenient for the operator to perform detection operations. The required device investment in the detection process is small, which does not need too much manual intervention from the operator, thereby being convenient for large-scale application in a power battery production line.

At step S130, the waveform data is received and imaging processing is performed on the waveform data to obtain an imaging diagram.

At step S140, whether or not the cell has a defect is detected according to the imaging diagram.

By analyzing the waveform data and performing imaging processing, the imaging diagram is generated, which is convenient to analyze whether or not the cell has a defect according to the imaging diagram, and can accurately identify internal defects of the cell. For example, color temperature analysis may be performed according to the imaging diagram to determine whether or not the cell has a defect.

According to the detection method based on the battery defect detection system 100 provided by the embodiments of the disclosure, when the scanning trigger signal is acquired, the ultrasonic transceiver 400 is controlled to emit ultrasonic waves to the battery 300, and the motion control platform 600 scans the battery 300 within the preset scanning range, so that the ultrasonic transceiver 400 receives the waveform data, and the waveform data is collected by the oscilloscope 500, which is convenient for analyzing the waveform data. As the waveform data is the data of ultrasonic waves after the ultrasonic waves pass through the cell, the internal defects of the cell can be accurately identified. By analyzing the waveform data and performing imaging processing, whether or not the cell has a defect can be intuitively judged according to the imaging diagram, and an operator can generate the imaging diagram only by triggering the scanning trigger signal, so the operation is simple and convenient.

In the detection method above, the motion control platform 600 includes a servo driver, a servo motor and a scanning frame 610 which are connected in sequence, the servo motor is connected with the servo driver and the scanning frame 610 respectively, and the servo motor is configured for driving the scanning frame 610 to perform step motion within a preset scanning range, so that the ultrasonic transceiver 400 receives multiple segments of waveform data, and the oscilloscope 500 collects the waveform data in segments. After the ultrasonic transceiver 400 starts to work, the ultrasonic transceiver transmits synchronization signal to the oscilloscope 500 and the motion control platform 600 respectively, so that the motion control platform starts to perform each step scanning motion and the oscilloscope 500 starts to read each waveform data.

Figure 3:
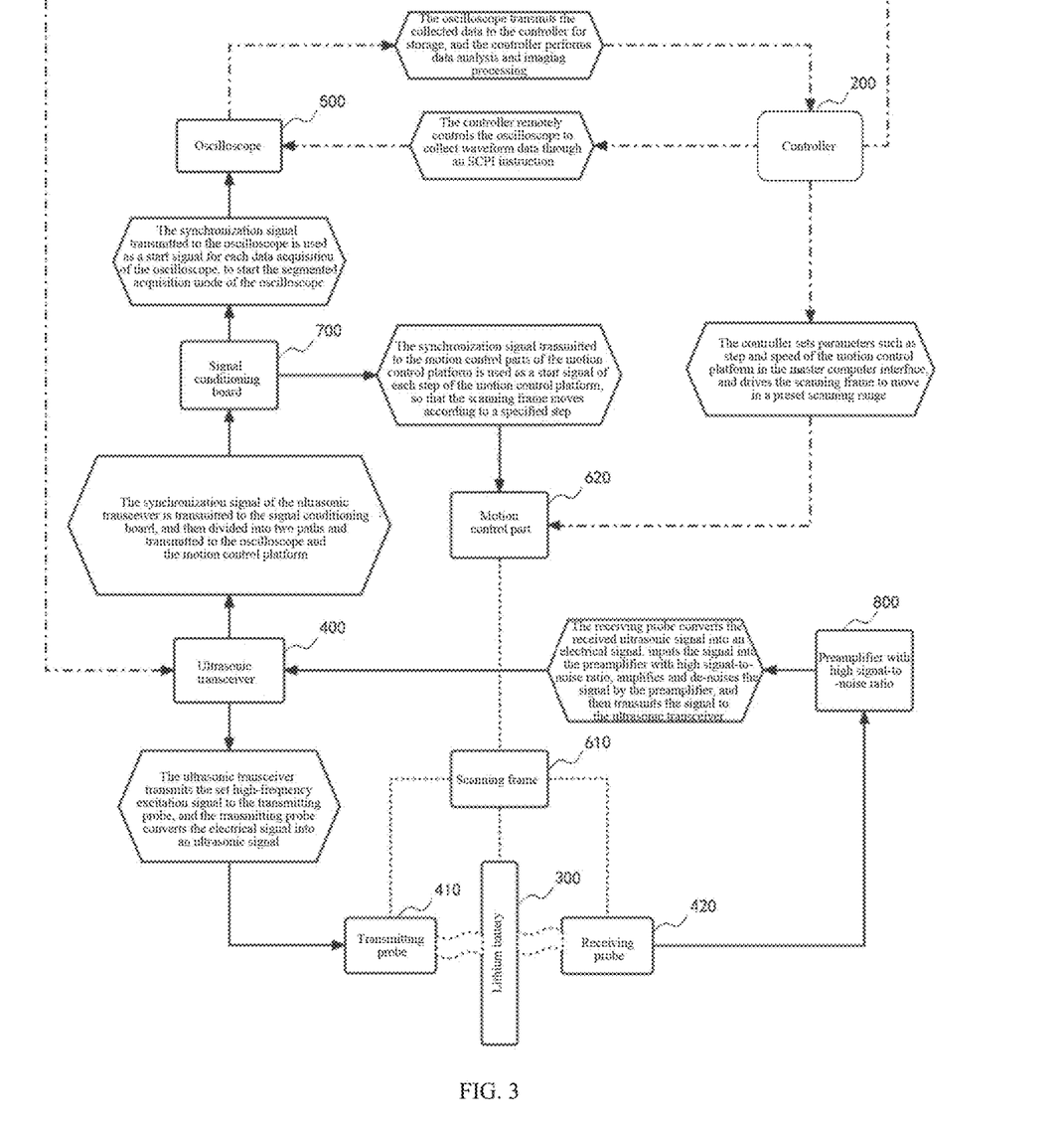
FIG. 3 is a specific implementation diagram of a detection method based on a battery defect detection system provided by another embodiment of the disclosure.

As shown in FIG. 2 and FIG. 3, it should be noted that, the servo driver and the servo motor are motion control parts 620 of the motion control platform 600, and the motion control parts 620 can drive the scanning frame 610 to perform step motion within the preset scanning range, so that the motion control platform 600 can perform step scanning motion, that is, scan different positions of the battery 300 in segments, so that the ultrasonic transceiver 400 can receive multiple segments of waveform data. Accordingly, the oscilloscope 500 may be controlled to work in a segmented acquisition mode, that is, the oscilloscope 500 can acquire the waveform data from the ultrasonic transceiver 400 in segments, and meanwhile, can display the waveform data in the segmented acquisition mode in real time. As the ultrasonic transceiver 400 is electrically connected with the oscilloscope 500 and the motion control platform 600 respectively, the ultrasonic transceiver 400 can stably output synchronization signal in a working period after working. The synchronization signal is a pulse signal. The ultrasonic transceiver 400 transmits the synchronization signal to the oscilloscope 500 and the motion control platform 600 according to a stable and orderly pulse sequence. Both the oscilloscope 500 and the motion control platform 600 use the synchronization signal as a start signal of data acquisition. When the motion control platform 600 receives the start signal, the scanning frame 610 is controlled to scan according to a designated step through the servo driver and servo motor. Every time the motion control platform 600 scans one point, the oscilloscope 500 starts reading the waveform data from the ultrasonic transceiver 400, and stores waveform data of all the points in a designated folder, which is convenient for subsequent processing, analysis and imaging. Because both the oscilloscope 500 and the motion control platform 600 are based on the same synchronization signal, the whole battery defect detection system 100 is synchronized in the same time period, and the collected waveform data corresponds to stepping positions one by one, which is conducive to ensuring the stability and order of the work. In addition, since the detection accuracy of cell defects reaches 0.2 mm in step, equipping the motion control platform 600 with the servo driver and the servo motor can accurately execute the scanning process meeting the step requirements according to the synchronization signal of the ultrasonic transceiver 400. The motion control platform 600 is a triaxial motion platform, which is convenient for executing detection.

Figure 4:
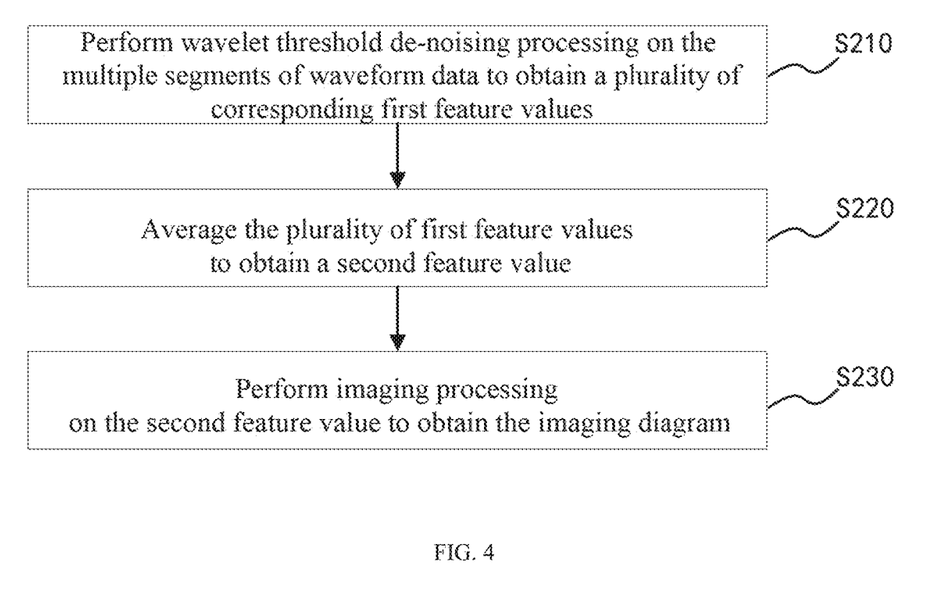
FIG. 4 is a flow chart of a detection method based on a battery defect detection system provided by another embodiment of the disclosure.

As shown in FIG. 4, in step S130, the performing imaging processing on the waveform data to obtain an imaging diagram includes, but not limited to steps S210 to S230.

In step S210, wavelet threshold de-noising processing is performed on the multiple segments of waveform data to obtain a plurality of corresponding first feature values.

In step S220, the plurality of first feature values is averaged to obtain a second feature value.

In step S230, imaging processing is performed on the second feature value to obtain the imaging diagram.

As the oscilloscope 500 may be set to operate in a segmented acquisition mode, for example, the number of segments may be set to 3, which results in three segments of waveform data. Three first feature values corresponding to the waveform data can be extracted through wavelet threshold de-noising on the three segments of waveform data, wherein the first feature value is an initial feature value of the waveform data corresponding to each step after transmission, and the three first feature values are further averaged to obtain a second feature value which can reflect a defect state of a test object, which can effectively improve accuracy of the feature values of the transmitted waveform data. An imaging diagram obtained by performing thermal imaging according to the second feature value may be used to analyze whether or not the cell has a defect.

Figure 5:
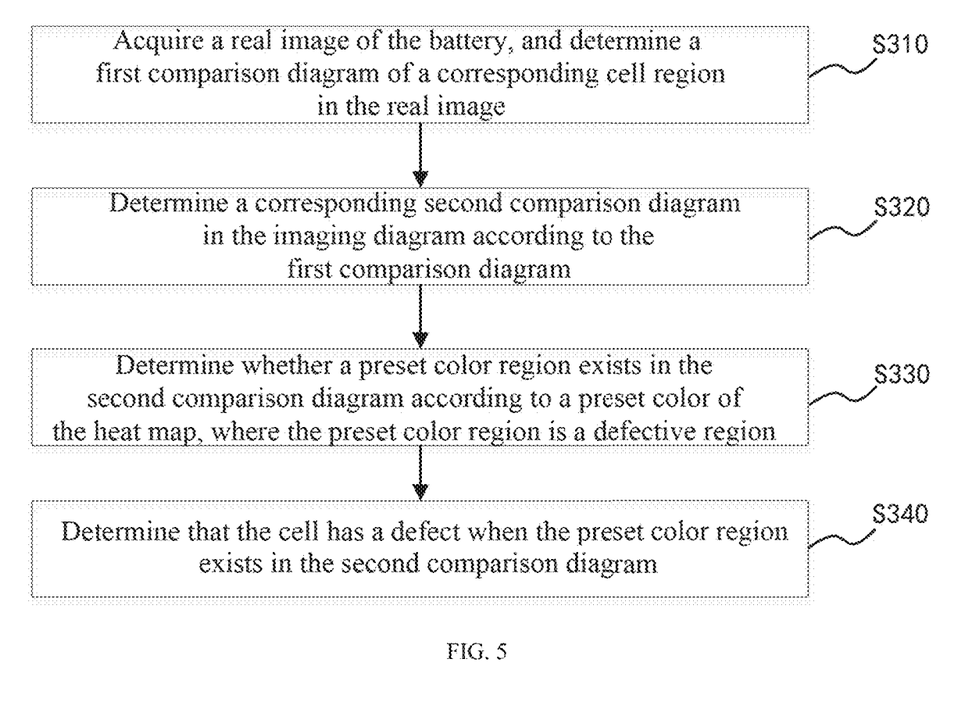
FIG. 5 is a flow chart of a detection method based on a battery defect detection system provided by another embodiment of the disclosure.

As shown in FIG. 5, in the detection method above, the imaging diagram is a heat map, and the detecting whether or not the cell has a defect according to the imaging diagram includes, but is not limited to steps S310 to S340.

In step S310, a real image of the battery is acquired, and a first comparison diagram of a corresponding cell region is determined in the real image.

In step S320, a corresponding second comparison diagram is determined in the imaging diagram according to the first comparison diagram.

In step S330, whether or not a preset color region exists in the second comparison diagram is determined according to a preset color of the heat map, wherein the preset color region is a defective region.

In step S340, it is determined that the cell has a defect when the preset color region exists in the second comparison diagram.

Figure 6:
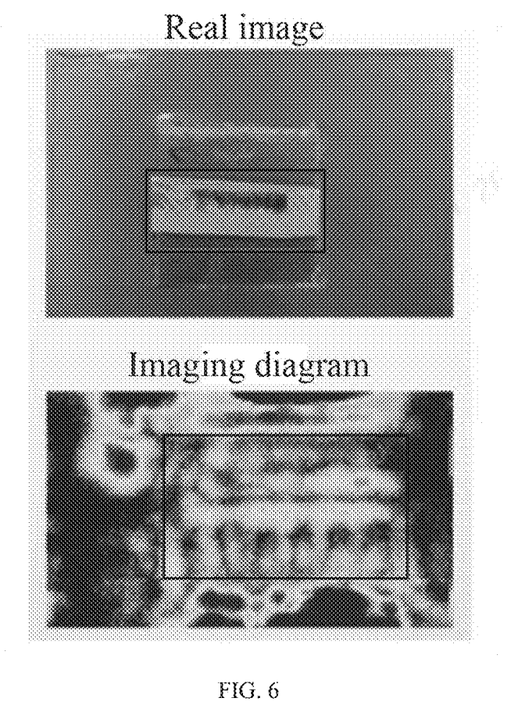
FIG. 6 is a schematic diagram showing comparison of a real image with an imaging diagram provided by the embodiment of the disclosure.
Figure 7:
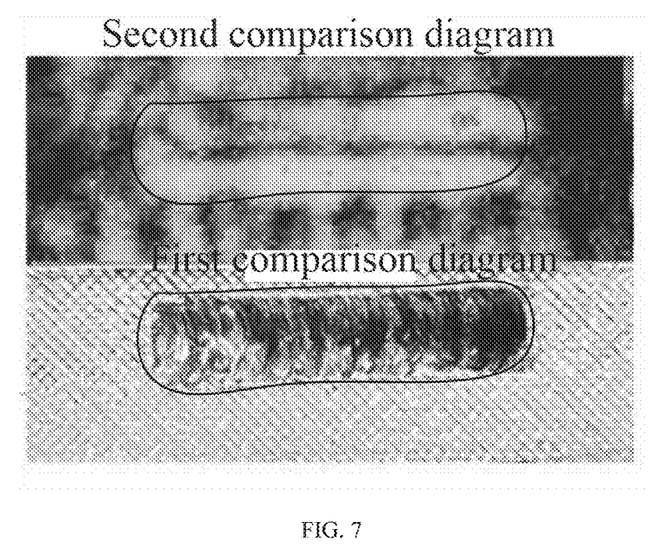
FIG. 7 is a schematic diagram including a first comparison diagram and a second comparison diagram provided by an embodiment of the disclosure.

As shown in FIG. 6 and FIG. 7, taking cell tab soldering quality detection for example, in order to effectively show the defects in a battery tab soldering region, thermal imaging is performed by means of a heat map. For example, the imaging diagram includes three colors, red, yellow and blue, and the preset color may be yellow. A deep red region in the imaging diagram indicates that sound waves are completely transmitted, which should be a region where the tab is located. A blue region indicates that sound waves are basically impermeable, which is a normal soldering region of the tab or a region around which wooden boards are fixed. A yellow region indicates relative permeability of sound waves to a melt-through region of the tab, which is a severely melt-through region. By obtaining the real image of the battery 300, the region where the battery tab is located (the region within a frame line in the real image of FIG. 6) may be intercepted, and the first comparison diagram shown in the lower part of FIG. 7 may be obtained. By comparing the real image with the imaging diagram, and combining the deep red region in the imaging diagram (the region within the frame line in FIG. 6), the second comparison diagram (the upper part of FIG. 7) corresponding to the battery tab region in the imaging diagram may be determined. It is determined whether or not the preset color region (the region within the frame line in the second comparison diagram of FIG. 7) exists in the second comparison diagram, that is, whether or not the yellow region exists. If the preset color region exists, it indicates that there is a soldering defect region. It is determined that there is a soldering defect in the battery tab, and such tab has potential safety hazards. The method of the disclosure can facilitate large-scale inspection in a power battery production line to screen out defective products.

As shown in FIG. 6 to FIG. 9, in the detection method above, after it is determined in step S340 that the cell has a defect, the method further includes, but is not limited to, steps 5410 and 5420.

Figure 9:
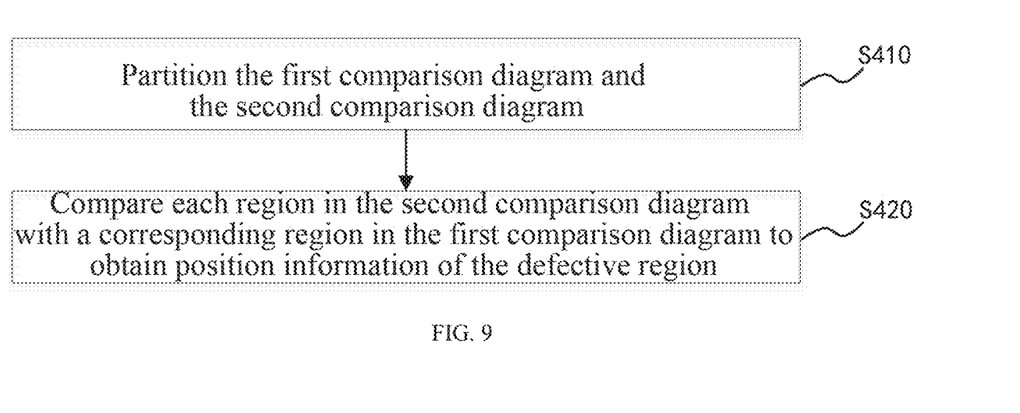
FIG. 9 is a flow chart of a detection method based on a battery defect detection system provided by another embodiment of the disclosure.

In step S410, the first comparison diagram and the second comparison diagram are partitioned for processing.

In step S420, each region in the second comparison diagram is compared with a corresponding region in the first comparison diagram to obtain position information of the defective region.

Figure 8:
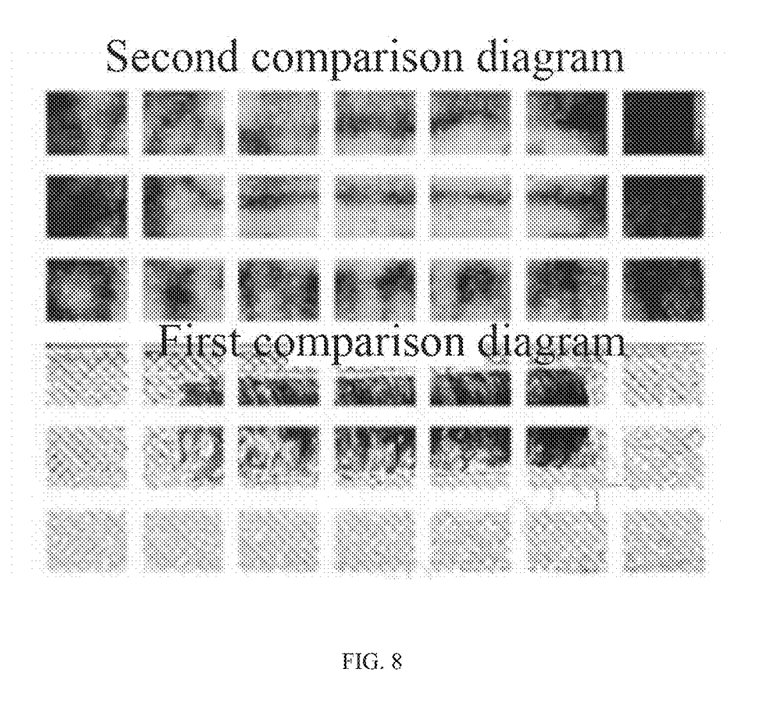
FIG. 8 is a schematic diagram showing comparison of a first comparison diagram and a second comparison diagram after partitioning provided by another embodiment of the disclosure.

If it is determined that the cell has a defect, the first comparison diagram and the second comparison diagram are partitioned for processing, so that a one-to-one correspondence between the imaging diagram and the real image can be displayed intuitively. By comparing each region in the second comparison diagram with the corresponding region in the first comparison diagram, accurate position information of the cell defective region in the real image can be obtained, which is convenient for locating a defective part of an object to be detected. It should be noted that the number of partitioned blocks may be configured according to specific lengths of rows and columns in the comparison diagram.

As shown in FIG. 2, embodiments according to a second aspect of the disclosure provide a battery defect detection system 100, wherein the battery defect detection system 100 includes a controller 200, a battery 300, an ultrasonic transceiver 400 for transmitting ultrasonic waves to the battery 300, an oscilloscope 500 and a motion control platform 600 for scanning the battery 300, the ultrasonic transceiver 400 is electrically connected with the oscilloscope 500 and the motion control platform 600 respectively, the controller 200 is connected with the ultrasonic transceiver 400, the oscilloscope 500 and the motion control platform 600 respectively, and the controller 200 is configured for executing the detection method according to the embodiments of the first aspect.

According to the battery defect detection system 100 provided by the embodiments of the disclosure, when the scanning trigger signal is acquired, the controller 200 controls the ultrasonic transceiver 400 to emit ultrasonic waves to the battery 300, and the motion control platform 600 scans the battery 300 within the preset scanning range, so that the ultrasonic transceiver 400 receives the waveform data, and the waveform data is collected by the oscilloscope 500, which is convenient for analyzing the waveform data. As the waveform data is the data of ultrasonic waves after the ultrasonic waves pass through the cell, the internal defects of the cell can be accurately identified. By analyzing the waveform data and performing imaging processing, whether or not the cell has a defect can be intuitively judged according to the imaging diagram, and an operator can generate the imaging diagram only by triggering the scanning trigger signal, so the operation is simple and convenient.

As shown in FIG. 3, in the battery defect detection system 100 above, a signal conditioning board 700 is further included, wherein the ultrasonic transceiver 400 is connected with the oscilloscope 500 and the motion control platform 600 respectively through the signal conditioning board 700, and the motion control platform 600 includes a servo driver, a servo motor and a scanning frame which are connected in sequence, the servo motor is connected with the servo driver and the scanning frame 610 respectively, and the servo motor is configured for driving the scanning frame 610 to perform step motion within a preset scanning range, so that the ultrasonic transceiver 400 receives multiple segments of waveform data, and the oscilloscope 500 collects the waveform data in segments. After the ultrasonic transceiver 400 starts to work, the ultrasonic transceiver transmits a synchronization signal to the oscilloscope 500 and the motion control platform 600 respectively, so that the motion control platform 600 starts to perform each step scanning motion and the oscilloscope 500 starts to read each waveform data.

It should be noted that the controller 200 may control the oscilloscope 500 to work in the segmented acquisition mode, that is, the oscilloscope 500 can collect waveform data in segments, and display the waveform data in the segmented acquisition mode in real time. Accordingly, the motion control platform 600 can perform step scanning motion, that is, scan different positions of the battery 300 in segments. The ultrasonic transceiver 400 may stably output a synchronization signal in a working period. After passing through the signal conditioning board 700, the synchronization signal is transmitted to the oscilloscope 500 and the motion control platform 600 according to a stable and orderly pulse sequence. The synchronization signal transmitted to the motion control platform 600 is used as a start signal of each step to make the motion control platform move according to a designated step (minimum 0.1 mm). The synchronization signal transmitted to the oscilloscope 500 is used as a start signal of each data acquisition of the oscilloscope 500, to start the segmented acquisition mode of the oscilloscope 500, which ensures stability and order of the detection process, and also ensures consistency of a scanning position of the motion control platform 600 and a signal receiving position of the ultrasonic transceiver 400.

Specifically, the motion control platform 600 includes a scanning frame 610, a servo driver and a servo motor. The servo driver and the servo motor are motion control parts 620 of the motion control platform 600, and the motion control parts 620 can drive the scanning frame 610 to perform step motion within the preset scanning range, so that the motion control platform 600 can perform step scanning motion. In addition, a master computer interface may also be set. By clicking a "single cycle" button on the master computer interface, the controller 200 controls the motion control platform 600 to work after acquiring the scanning trigger signal, and the motion control platform 600 may output a start signal, which marks start and stop of the battery defect detection system 100. The start signal is from a low level to a high level, and then the scanning frame 610 is controlled to move according to the specified scanning range. After the single cycle is completed, the low level may be restored from the high level to end the motion of the scanning frame 610 and the data acquisition of the oscilloscope 500. It may be understood that in one detection cycle, the motion control platform 600 may receive the synchronization signal from the signal conditioning board 700 multiple times. Every time the motion control platform 600 receives the synchronization signal, the motion control platform moves in a designated step (which is currently set to be 0.2 mm), and the range and speed of the motion scanning may be configured on the master computer interface.

It should be noted that parameters of the motion control platform 600 may be set in the master computer interface, and the controller 200 sets relevant parameters such as the step and speed of the motion control platform 600 through the master computer, so as to drive the scanning frame 610 to move within the preset scanning range. For example, a starting point, a stepped distance, a moving speed and other related parameters may be set in a menu bar of the master computer interface, and the scanning mode may be selected as required, which is convenient for an operator to operate. On a main interface of a test interface, the operator may observe a real-time motion state of the scanning frame 610, and the display is more intuitive.

As shown in FIG. 3, the battery defect detection system 100 above further includes a preamplifier 800, and a transmitting probe 410 and a receiving probe 420 arranged on the scanning frame 610, wherein the transmitting probe 410 is connected with the ultrasonic transceiver 400, and the preamplifier 800 is connected with the receiving probe 420 and the ultrasonic transceiver 400 respectively.

By arranging the transmitting probe 410 and the receiving probe 420 on the scanning frame 610, multi-angle scanning of the battery 300 can be realized through the motion of the scanning frame 610. The ultrasonic transceiver 400 is provided with an ultrasonic generator and an ultrasonic receiver. The specific process of air-coupled ultrasonic detection of a lithium battery based on the battery defect detection system 100 in the embodiments of the disclosure is as follows. When the JPR-600C ultrasonic transceiver 400 starts to work, firstly, the JPR-600C high-power ultrasonic generator outputs a required excitation signal to excite the high-sensitivity 0.4K20N-TX R40 air-coupled transmitting probe 410, which converts an electrical signal into an ultrasonic signal and transmits the signal to the air. The ultrasonic signal passes through the lithium battery 300 and enters the air, which is received by the 0.4K20N-RX R40 air-coupled receiving probe 420 and then the ultrasonic signal is converted into an electrical signal, and input into the PR-60A-06 preamplifier 800 with adjustable gain of 0 dB to 60 dB. After the preamplifier 800 filters and amplifies the signal, the signal is received by the JPR-600C ultrasonic receiver, and then the electrical signal is converted into a digital signal and transmitted to the oscilloscope 500, which is then input to the controller 200 through the oscilloscope 500. The controller 200 realizes a scanning task of specific parameters through the servo driver, the servo motor and the scanning frame 610. The oscilloscope 500 transmits the acquired waveform data to the controller 200 for storage. The controller 200 analyzes the waveform data and performs imaging, and judges whether or not the cell has a defect according to the imaging diagram, thus realizing detection of the lithium battery 300.

It should be noted that, because the embodiments of the disclosure adopt air coupling, the acoustic impedance and high-frequency sound waves which are very different between the air and the detected workpiece will be greatly absorbed in the air, so that the received signals of ultrasonic waves are extremely small and a signal-to-noise ratio is low. By adopting the above-mentioned high-power ultrasonic transceiver 400, the high-sensitivity air-coupled sound wave probe and the preamplifier 800 with a high signal-to-noise ratio, the signal-to-noise ratio can be improved and the ultrasonic signals can be effectively collected.

The specific detection process based on the battery defect detection system 100 above will be described in detail below:

As shown in FIG. 3, the controller 200 may remotely control the oscilloscope 500 to collect waveform data through an SCPI instruction, for example, to set the oscilloscope 500 to work in a segmented collection mode, and set the parameters of the JPR600C ultrasonic transceiver 400 on the controller 200. When the scanning trigger signal is acquired, the controller 200 controls the ultrasonic transceiver 400 and the motion control platform 600 to work. The ultrasonic transceiver 400 transmits a preset high-frequency excitation signal to the transmitting probe 410. The transmitting probe 410 converts the electrical signal into an ultrasonic signal. The ultrasonic signal passes through the lithium battery 300 and enters the air to be received by the receiving probe 420. The receiving probe 420 converts the received ultrasonic signal into an electrical signal, which is input into the preamplifier 800 with the high signal-to-noise ratio, amplified and de-noised by the preamplifier 800, and then transmitted to the ultrasonic transceiver 400. The ultrasonic transceiver 400 outputs the synchronization signal from a Trig out port of a back panel. After the synchronization signal is transmitted to the signal conditioning board 700, the synchronization signal is divided into two paths and transmitted to the oscilloscope 500 and the motion control platform 600 respectively. The synchronization signal transmitted to the oscilloscope 500 is used as a start signal for each data acquisition of the oscilloscope 500, to start the segmented acquisition mode of the oscilloscope 500. The synchronization signal transmitted to the motion control parts of the motion control platform 600 is used as a start signal of each step of the motion control platform 600, so that the scanning frame 610 moves according to a specified step. Every time the motion control platform 600 scans one point, the oscilloscope 500 starts reading the waveform data from the ultrasonic transceiver 400, and the oscilloscope 500 transmits the collected data to the controller 200 for storage. The controller 200 performs data analysis and imaging processing, so as to judge whether or not the cell has a defect.

Figure 10:
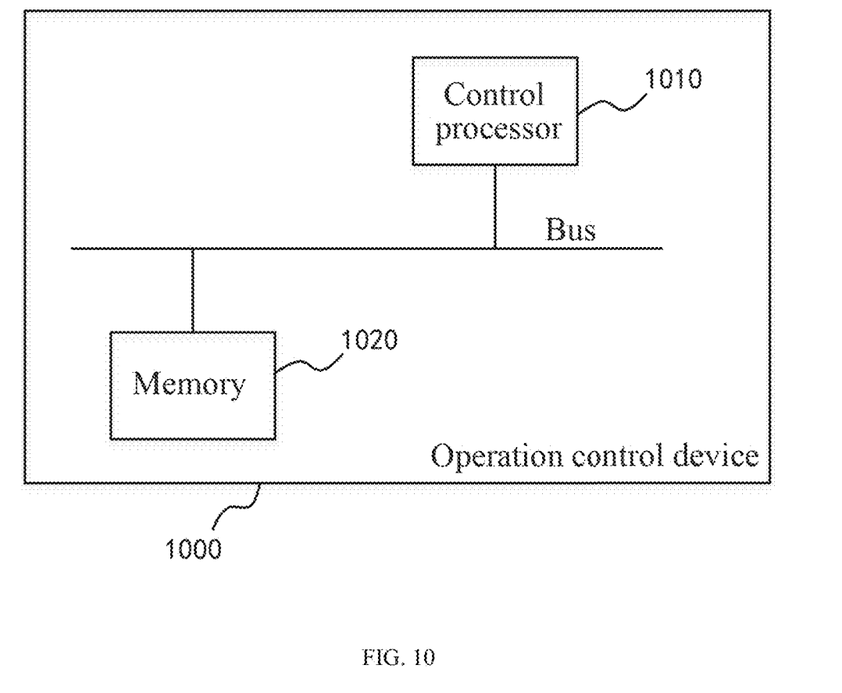
FIG. 10 is a structural schematic diagram of an operation control device provided by an embodiment of the disclosure.

As shown in FIG. 10, embodiments according to a third aspect of the disclosure provide an operation control device 1000, including at least one control processor 1010 and a memory 1020 communicatively connected with the at least one control processor 1010, wherein the memory 1020 stores an instruction executable by the at least one processor 1010, and the instruction, when executed by the at least one processor 1010, causes the at least one processor 1010 to perform the detection method according to the embodiments of the first aspect, such as the steps S110 to S140 in FIG. 1, the method flow in FIG. 3, the steps S210 to S230 in FIG. 4, the steps S310 to S340 in FIG. 5, or the steps S410 and S420 in FIG. 9.

According to the operation control device 1000 provided by the embodiments of the disclosure, when the scanning trigger signal is acquired, the ultrasonic transceiver 400 is controlled to emit ultrasonic waves to the battery 300, and the motion control platform 600 scans the battery 300 within the preset scanning range, so that the ultrasonic transceiver 400 receives the waveform data, and the waveform data is collected by the oscilloscope 500, which is convenient for analyzing the waveform data. As the waveform data is the data of ultrasonic waves after the ultrasonic waves pass through the cell, the internal defects of the cell can be accurately identified. By analyzing the waveform data and performing imaging processing, whether or not the cell has a defect can be intuitively judged according to the imaging diagram, and an operator can generate the imaging diagram only by triggering the scanning trigger signal, so the operation is simple and convenient.

Moreover, the embodiments according to a fourth aspect of the disclosure provide a computer-readable storage medium, wherein the computer-readable storage medium stores a computer-executable instruction which, when executed by a computer, causes the computer to perform the detection method according to the embodiments of the first aspect, such as the steps S110 to S140 in FIG. 1, the method flow in FIG. 3, the steps S210 to S230 in FIG. 4, the steps S310 to S340 in FIG. 5, or the steps S410 and S420 in FIG. 9.

According to the computer-readable storage medium provided by the embodiments of the disclosure, when the scanning trigger signal is acquired, the ultrasonic transceiver 400 is controlled to emit ultrasonic waves to the battery 300, and the motion control platform 600 scans the battery 300 within the preset scanning range, so that the ultrasonic transceiver 400 receives the waveform data, and the waveform data is collected by the oscilloscope 500, which is convenient for analyzing the waveform data. As the waveform data is the data of ultrasonic waves after the ultrasonic waves pass through the cell, the internal defects of the cell can be accurately identified. By analyzing the waveform data and performing imaging processing, whether or not the cell has a defect can be intuitively judged according to the imaging diagram, and an operator can generate the imaging diagram only by triggering the scanning trigger signal, so the operation is simple and convenient.

Those of ordinary skills in the art will appreciate that all or some of the steps and systems in the methods disclosed above may be implemented as software, firmware, hardware, and suitable combinations thereof. Some physical components or all of the physical components may be implemented as software executed by a processor, such as a central processing unit, a digital signal processor or a microprocessor, or implemented as hardware, or implemented as an integrated circuit, such as an application specific integrated circuit. Such software may be distributed on a computer-readable medium, which may include a computer storage medium or a non-transitory medium and a communication medium or a transitory medium. As well known to those of ordinary skills in the art, the term computer storage medium includes volatile and non-volatile, removable and non-removable media implemented in any method or technology for storing information such as computer-readable instruction, data structure, programming module or other data. The computer storage medium includes, but is not limited to, RAM, ROM, EEPROM, flash memory or other memory technology, CD-ROM, digital versatile disc DVD or other optical disc memory, magnetic cassette, magnetic tape, magnetic disk memory or other magnetic memory device, or may be any other medium that can be used to store the desired information and can be accessed by a computer. Moreover, it is well known to those of ordinary skills in the art that the communication medium typically includes computer-readable instructions, data structures, program modules, or other data in a modulated data signal, such as a carrier wave or other transmission mechanism, and may include any information delivery medium.

The embodiments of the disclosure are described in detail with reference to the drawings above, but the disclosure is not limited to the above embodiments, and various changes may also be made within the knowledge scope of those of ordinary skills in the art without departing from the purpose of the disclosure.

What is claimed is:

1. A detection method based on a battery defect detection system, wherein the battery defect detection system comprises a battery, an ultrasonic transceiver for transmitting ultrasonic waves to the battery, an oscilloscope and a motion control platform for scanning the battery, the ultrasonic transceiver is electrically connected with the oscilloscope and the motion control platform respectively, and the detection method comprises:

acquiring a scanning trigger signal, and controlling the ultrasonic transceiver and the motion control platform to work, so that the ultrasonic transceiver receives waveform data of ultrasonic waves passing through a cell;

controlling the oscilloscope to collect the waveform data;

receiving the waveform data and performing imaging processing on the waveform data to obtain an imaging diagram;

detecting whether or not the cell has a defect according to the imaging diagram; and wherein the imaging diagram is a heat map, and the detecting whether or not the cell has a defect according to the imaging diagram comprises:

acquiring a real image of the battery, and determining a first comparison diagram of a corresponding cell region in the real image;

determining a corresponding second comparison diagram in the imaging diagram according to the first comparison diagram;

determining whether a preset color region exists in the second comparison diagram according to a preset color of the heat map, wherein the preset color region is a defective region; and determining that the cell has a defect when the preset color region exists in the second comparison diagram.

2. The detection method according to claim 1, wherein the motion control platform comprises a servo driver, a servo motor and a scanning frame which are connected in sequence, the servo motor is connected with the servo driver and the scanning frame respectively, and the servo motor is configured for driving the scanning frame to perform step motion within a preset scanning range, so that the ultrasonic transceiver receives multiple segments of waveform data, and the oscilloscope collects the waveform data in segments; after the ultrasonic transceiver starts to work, the ultrasonic transceiver transmits synchronization signal to the oscilloscope and the motion control platform respectively, so that the motion control platform starts to perform each step scanning motion and the oscilloscope starts to read each waveform data.

3. The detection method according to claim 2, wherein the performing imaging processing on the waveform data to obtain an imaging diagram comprises:

performing wavelet threshold de-noising processing on the multiple segments of waveform data to obtain a plurality of corresponding first feature values;

averaging the plurality of first feature values to obtain a second feature value; and performing imaging processing based on the second feature value to obtain the imaging diagram.

4. The detection method according to claim 1, wherein after the determining that the cell has a defect, the method further comprises:
partitioning the first comparison diagram and the second comparison diagram; and
comparing each region in the second comparison diagram with a corresponding region in the first comparison diagram to obtain position information of the defective region.

5. A battery defect detection system, comprising a controller, a battery, an ultrasonic transceiver for transmitting ultrasonic waves to the battery, an oscilloscope and a motion control platform for scanning the battery, the ultrasonic transceiver is electrically connected with the oscilloscope and the motion control platform respectively, the controller is connected with the ultrasonic transceiver, the oscilloscope and the motion control platform respectively, and the controller is configured for executing the detection method according to claim 1.

6. The battery defect detection system according to claim 5, further comprising a signal conditioning board, wherein the ultrasonic transceiver is connected with the oscilloscope and the motion control platform respectively through the signal conditioning board, and the motion control platform comprises a servo driver, a servo motor and a scanning frame which are connected in sequence, the servo motor is connected with the servo driver and the scanning frame respectively, and the servo motor is configured for driving the scanning frame to perform step motion within a preset scanning range, so that the ultrasonic transceiver receives multiple segments of waveform data, and the oscilloscope collects the waveform data in segments; after the ultrasonic transceiver starts to work, the ultrasonic transceiver transmits synchronization signal to the oscilloscope and the motion control platform respectively, so that the motion control platform starts to perform each step scanning motion and the oscilloscope starts to read each waveform data.

7. The battery defect detection system according to claim 6, further comprising a preamplifier, and a transmitting probe and a receiving probe arranged on the scanning frame, wherein the transmitting probe is connected with the ultrasonic transceiver, and the preamplifier is connected with the receiving probe and the ultrasonic transceiver respectively.

8. An operation control device, comprising at least one control processor and a memory communicatively connected with the at least one control processor, wherein the memory stores an instruction executable by the at least one control processor, and the instruction, when executed by the at least one control processor, causes the at least one control processor to perform the detection method according to claim 1.

9. A computer-readable storage medium, wherein the computer-readable storage medium stores a computer-executable instruction which, when executed by a computer, causes the computer to perform the detection method according to claim 1.

* * * * *